US011524693B2

(12) United States Patent
Nemeth et al.

(10) Patent No.: US 11,524,693 B2
(45) Date of Patent: Dec. 13, 2022

(54) VEHICLE CONTROL SYSTEM

(71) Applicant: KNORR-BREMSE Systeme fuer Nutzfahrzeuge GmbH, Munich (DE)

(72) Inventors: Huba Nemeth, Budapest (HU); Falk Hecker, Markgroeningen (DE); Tamas Rapp, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/277,428

(22) PCT Filed: Aug. 29, 2019

(86) PCT No.: PCT/EP2019/073129
§ 371 (c)(1),
(2) Date: Mar. 18, 2021

(87) PCT Pub. No.: WO2020/057934
PCT Pub. Date: Mar. 26, 2020

(65) Prior Publication Data
US 2021/0347370 A1 Nov. 11, 2021

(30) Foreign Application Priority Data

Sep. 18, 2018 (EP) ..................... 18195230

(51) Int. Cl.
*B60W 50/023* (2012.01)
*B60R 16/023* (2006.01)
(Continued)

(52) U.S. Cl.
CPC ....... *B60W 50/023* (2013.01); *B60R 16/0231* (2013.01); *B60T 17/22* (2013.01);
(Continued)

(58) Field of Classification Search
CPC .............. B60W 50/023; B60W 50/029; B60R 16/0231; B60T 17/22; B60T 2270/402;
(Continued)

(56) References Cited

U.S. PATENT DOCUMENTS 5,490,072 A * 2/1996 Hornback ............... B60T 8/885
701/76
5,508,594 A * 4/1996 Underwood ............. B60L 3/00
318/432

(Continued)

FOREIGN PATENT DOCUMENTS

CN 1771156 A 5/2006
CN 101638099 A 2/2010
(Continued)

OTHER PUBLICATIONS

Lei He, Changfu Zong, Honghui Zhao and Zhixin Yu, "The dual-core fault-tolerant control for Electronic Control Unit of Steer-By-Wire system," 2010 International Conference on Computer, Mechatronics, Control and Electronic Engineering, 2010, pp. 436-439, doi: 10.1109/CMCE.2010.5610097. (Year: 2010).*
(Continued)

*Primary Examiner* — Marthe Y Marc-Coleman
(74) *Attorney, Agent, or Firm* — Crowell & Moring LLP

(57) ABSTRACT

A vehicle control system has a first communication network, a first operation component, a first vehicle control unit connected to the communication network and to the first operation component, wherein the first vehicle control unit is configured to control a first data connection between the first operation component and the first vehicle control unit by a first signal to the first operation component, and a second vehicle control unit connected to the first operation component, wherein the second vehicle control unit is configured to control a second data connection between the first operation component and the second vehicle control
(Continued)

unit by a second signal to the first operation component. The first data connection and the second data connection can be controlled so that at least one of the first data connection and the second data connection is enabled or disabled.

17 Claims, 2 Drawing Sheets

(51) Int. Cl.
 *B60T 17/22* (2006.01)
 *B60W 50/029* (2012.01)
(52) U.S. Cl.
 CPC ...... *B60W 50/029* (2013.01); *B60T 2270/402* (2013.01); *B60T 2270/413* (2013.01)
(58) Field of Classification Search
 CPC ...... B60T 2270/413; B60T 8/885; B60T 8/88; B60Y 2200/14; B60Y 2400/81
 See application file for complete search history.

(56) References Cited

U.S. PATENT DOCUMENTS

| | | | |
|---|---|---|---|
| 6,015,193 A | 1/2000 | Vogel et al. | |
| 6,029,108 A | 2/2000 | Belschner | |
| 6,410,993 B1 | 6/2002 | Giers | |
| 7,866,761 B2* | 1/2011 | Gerum | B60T 13/66 303/127 |
| 9,195,232 B1 | 11/2015 | Egnor et al. | |
| 2006/0162986 A1* | 7/2006 | Disser | G06F 11/1633 180/402 |
| 2006/0232128 A1 | 10/2006 | Weiberle et al. | |
| 2008/0296106 A1* | 12/2008 | Nilsson | B60T 8/345 701/115 |
| 2010/0030409 A1 | 2/2010 | Smith et al. | |
| 2016/0009257 A1 | 1/2016 | Joyce et al. | |
| 2016/0009259 A1 | 1/2016 | Joyce et al. | |
| 2017/0072920 A1 | 3/2017 | Besier et al. | |
| 2018/0046161 A1* | 2/2018 | Yhr | G05B 19/0425 |

FOREIGN PATENT DOCUMENTS

| | | |
|---|---|---|
| CN | 105292086 A | 2/2016 |
| CN | 106043171 A | 10/2016 |
| DE | 197 17 686 A1 | 10/1998 |
| DE | 10 2015 206 572 A1 | 11/2015 |
| EP | 0 754 611 A1 | 1/1997 |
| EP | 0 924 125 A2 | 6/1999 |
| EP | 1 672 505 A2 | 6/2006 |
| EP | 1 997 703 A2 | 12/2008 |
| EP | 3 278 185 B1 | 10/2021 |
| JP | 59-155262 A | 9/1984 |
| JP | 2001-522331 A | 11/2001 |
| JP | 2016-507138 A | 3/2016 |
| JP | 2018-518857 A | 7/2018 |
| WO | WO 2016/155763 A1 | 10/2016 |

OTHER PUBLICATIONS

Hindi-language Office Action issued in Indian Application No. 202137010211 dated Feb. 15, 2022 with English translation (six (6) pages).
International Search Report (PCT/ISA/210) issued in PCT Application No. PCT/EP2019/073129 dated Nov. 4, 2019 (three (3) pages).
Written Opinion (PCT/ISA/237) issued in PCT Application No. PCT/EP2019/073129 dated Nov. 4, 2019 (five (5) pages).
Extended European Search Report issued in European Application No. 18195230.0 dated Feb. 28, 2019 (seven (7) pages).
Japanese-language Office Action issued in Japanese Application No. 2021-538904 dated May 9, 2022 with English translation (six (6) pages).
Chinese-language Office Action issued in Chinese Application No. 201980061042.7 dated Sep. 15, 2022 with English translation (13 pages).
Korean-language Office Action issued in Korean Application No. 10-2021-7010474 dated Oct. 17, 2022 with English translation (17 pages).

* cited by examiner

VEHICLE CONTROL SYSTEM

BACKGROUND AND SUMMARY OF THE INVENTION

The invention relates to a vehicle control system for use with one or more operation components such as brake actuators of a commercial vehicle. In modern commercial vehicles an increasing number of electronic control circuits are used. Among others electronic control circuits are integrated in the pneumatically actuated brake system of a vehicle and used to automate the brake system. To date many electronic control circuits used in brake systems of the state of the art vehicle layouts are implemented as single control circuits. For safety reasons a malfunction in the electronic control circuit results in a switchback of the brake system from electronic control to pneumatic control, so that the driver of the vehicle can still manually operate the brake system.

It would be desirable to relieve the driver from manual operation of the brake system in situations of failures of an electronic circuit and to increase the time period of electronic control of the brake system including situations where electronic components of the brake system fail.

U.S. Pat. No. 9,195,232 describes methods and systems for compensating for common failures in fail operational systems. A system includes a primary controller configured to perform functions of a vehicle such as propulsion braking and steering and a secondary controller configured in a redundant configuration with the primary controller. The controllers may perform cross-checks of each other and may each perform internal self-checks as well. Additionally, the system may include a control module configured to transfer control of the vehicle between the controllers based on detecting a fault. The control module may detect a common fault of the controllers that causes the control module to output a common fault signal. In response the system may transfer control to a safety controller configured to perform the vehicle functions until the system may transfer control back to the primary controller.

US 20160009257 describes a system which includes an autonomous sub-system that includes first and second braking modules. Each of the modules includes a processor and a memory the memory storing instructions executable by the processor for detecting a fault. The system further includes a brake sub-system programmed to actuate a brake mechanism in response to a signal from the second braking module. The autonomous sub-system is further programmed to select one of the braking modules to provide a signal to the brake mechanism depending on whether a fault is detected.

It is an object of the present invention to provide an improved electronic vehicle control system that is capable to handle a failure of one of its components in a reliable and safe manner so that electronic control of the vehicle control system is maintained during the failure.

The object is achieved by a vehicle control system having the features of the independent claims. Embodiments of the invention are described in the dependent claims.

According to the invention, a vehicle control system is provided that comprises a first communication network, a first operation component, a first vehicle control unit connected to the communication network and to the first operation component, wherein the first vehicle control unit is configured to control a first data connection between the first operation component and the first vehicle control unit by a first signal to the first operation component; and a second vehicle control unit connected to the first operation component, wherein the second vehicle control unit is configured to control a second data connection between the first operation component and the second vehicle control unit by a second signal to the first operation component, wherein the first data connection and the second data connection can be controlled by the first or second vehicle control unit so that at least one of the first data connection and the second data connection is enabled or disabled.

The capability of the system to disable at least one of the first data connection and the second data connection ensures that the first operation component can be physically separated from at least one of the first and the second vehicle control unit in case of a failure and a blocking of communication lines affected by the failure can be avoided. Among others this prevents the failure from affecting other connected operation components, while operability of the system and of the first operation component by a redundant or parallel control through the other data connection still connecting the first operation component to one of the first and the second vehicle control unit is maintained. One or both of the first data connection and the second data connection can comprise a communication line comprising one or more wires or a data bus. Alternatively, a wireless data connection can also be used.

For the transfer of the first and second signal from the first and second vehicle control unit to the first operation component the vehicle control system can comprise respective communication or signal lines comprising one or more wires or a data bus connecting the first and second vehicle control units to the first operation component, respectively. The signal lines between the first vehicle control unit, the second vehicle control unit and the first operation component or other operation components can be wake-up lines for the first operation component or other operation components. However, a wireless signal line can be used as well without limitation. A data bus used in the system to connect the first and second vehicle control units to the first operation component can be for example a controller area network (CAN) bus.

According to an embodiment, the first operation component can be an "intelligent" operation component that has data processing capabilities and includes one or more integrated circuits.

According to an embodiment, the first data connection between the first operation component and the first vehicle control unit comprises a switch comprising one of an opto-coupler, a galvanic switch or an inductive coupling switch. The switch can be actuated by the first operation component which can receive a corresponding control signal from the first vehicle control unit via a signal line or wirelessly. It is also possible that the switch is directly or autonomously actuated by the first operation component without receiving a control signal. The switch can be connected with or inserted in a communication line between the first operation component and the first vehicle control unit.

According to another embodiment, the second data connection between the first operation component and the second vehicle control unit also comprises a switch comprising one of an opto-coupler, a galvanic switch or an inductive coupling switch. The switch can be actuated by the first operation component which can receive a corresponding control signal from the second vehicle control unit via a signal line or wirelessly. It is also possible that the switch is directly or autonomously actuated by the first operation component without receiving a control signal. The switch can be connected with or inserted in a communication line between the first operation component and the second vehicle control unit.

According to a further embodiment, the first operation component comprises one or more transceivers connecting the first operation component to at least one of the first and second vehicle control units, respectively. Each of the one or more transceivers can be coupled or connected with a switch as mentioned above and can be connected via the switch to a communication line between the first operation component and the first vehicle control unit and/or a communication line between the first operation component and the second vehicle control unit so that data can be transferred between the first operation component and the first and second vehicle control units. Each of the one or more transceivers can also be coupled or connected to one or more other operation components which can be connected in parallel with the first and second vehicle control unit. Furthermore, each of the one or more transceivers can be coupled to at least one of the first and second vehicle control units by a signal line or wirelessly to receive one or more control signals from the first and second vehicle control units, respectively. Hence, the transceivers are configured to receive a control signal from a vehicle control unit they are connected with and are configured to control the switch connected to the transceiver to separate the communication line connected to the transceiver or connect the communication line according to the control signal.

According to an embodiment, the second vehicle control unit is connected to a second communication network that is separate from the first communication network. Providing two separate communication networks permits to provide redundancy or duplicity and hence increased security of the control system in addition to other duplicated components such as operation components or vehicle control units of the system.

According to an embodiment, the second vehicle control unit is connected to the first vehicle control unit and data can be transferred from the first communication network to the first vehicle control unit and to the second vehicle control unit via a connection between the first and the second vehicle control units. The connection between the vehicle control units makes it possible to mitigate a situation in which one of the vehicle communication networks is in failure or down. In such a case data from the intact vehicle communication network can be transmitted to the other vehicle control unit via the connection between the vehicle control units. The connection between the vehicle control units also provides an opportunity to perform a plausibility check or crosscheck tasks by one or both of the vehicle control units to increase safety.

According to an embodiment, the first vehicle control unit is a master vehicle control unit and the second vehicle control unit is a slave vehicle control unit, wherein the master-slave role is determined and controlled by at least one of the control units.

According to an embodiment, the system further comprises a second operation component, wherein the first vehicle control unit is connected to the second operation component and the first vehicle control unit is configured to control a third data connection between the second operation component and the first vehicle control unit by a third signal to the second operation component and the second vehicle control unit is connected to the second operation component and the second vehicle control unit is configured to control a fourth data connection between the second operation component and the second vehicle control unit by a fourth signal to the second operation component, wherein the third data connection and the fourth data connection can be controlled so that at least one of the third data connection and the fourth data connection is enabled or disabled.

Similar to the first and the second data connections described above the capability of the system to disable one or both of the third data connection and the fourth data connection, if present in the system, ensures that the second operation component can be physically separated from at least one of the third and the fourth vehicle control unit in case of a failure and a blocking of communication lines affected by the failure can be avoided. Among others this prevents the failure from affecting other connected operation components, like the first operation component, while operability of the system and of the second operation component by a redundant control through the other data connection still connecting the second operation component to one of the third and the fourth vehicle control unit is maintained. The third data connection and the fourth data connection can be configured equally like the first and second data connection. For example, similar to the first and the second data connection, one or both of the third and the fourth data connection can comprise a communication line comprising one or more wires or a data bus. However, a wireless data connection can also be used.

For the transfer of the third and fourth signals from the first and second vehicle control units to the second operation component the vehicle control system can comprise respective signal lines which correspond to the signal lines used for the first and second control signals. The signal lines may comprise one or more wires or a data bus connecting the first and second vehicle control units to the second operation component, respectively. The signal line between the first vehicle control unit, the second vehicle control unit and the second operation component or other operation components can be a wake-up line for the operation component. However, a wireless transfer line can be used as well without limitation.

According to an embodiment, also the second operation component can be an "intelligent" operation component that has data processing capabilities and includes one or more integrated circuits.

According to an embodiment, one or both of the third data connection and the fourth data connection between the second operation component and the first and second vehicle control units, respectively, comprise a switch comprising one of an opto-coupler, a galvanic switch or an inductive coupling switch. The switch or the switches can be actuated by the second operation component which can receive one or more corresponding control signals from the first vehicle control unit or the second vehicle control unit via a signal line or wirelessly. It may be possible that the switch is or the switches are directly or autonomously actuated by the second operation component without receiving a control signal, if the second operation component is configured correspondingly. The switch can be connected with or inserted in a communication line between the second operation component and the first vehicle control unit or a corresponding communication line between the second operation component and the second vehicle control unit.

According to a further embodiment, the second operation component comprises one or more transceivers connecting the second operation component to at least one of the first and second vehicle control units, respectively. Each of the one or more transceivers can be coupled or connected with a switch as mentioned above and can be connected to a communication line between the second operation component and the first vehicle control unit or a communication line between the second operation component and the second vehicle control unit so that data can be transferred between the second operation component and the first and second vehicle control units, respectively. Each of the one or more transceivers can also be coupled or connected to one or more other operation components like the first operation component or a corresponding transceiver thereof. Furthermore, each of the one or more transceivers can be coupled to at least one of the first and second vehicle control units by a further line like a signal line or wirelessly to receive one or more control signals from the first and second vehicle control units, respectively.

According to an embodiment, at least one of the first and second operation components is one of a brake actuator, a steering actuator or a propulsion actuator of a vehicle.

According to another embodiment, the vehicle control system can comprise one or more additional operation components and one or more additional vehicle control units comprising the same or similar features as the first and second operation component and the first and second control units described above.

According to the invention, a method of controlling a vehicle by means of a vehicle control system is provided. The vehicle control system may comprise a first communication network, a first operation component, a first vehicle control unit connected to the communication network and to the first operation component, and a second vehicle control unit connected to the first operation component. The method comprises acts of enabling a first data connection between the first operation component and the first vehicle control unit by a first signal to the first operation component, receiving data from the first operation component via the first data connection at the first vehicle control unit, determining that the data received from the first operation component is erroneous, sending a signal from the first vehicle control unit to the first operation component to disable the first data connection between the first operation component and the first vehicle control unit and disabling the first data connection between the first operation component and the first vehicle control unit.

Disabling the first data connection ensures that the first operation component is separated from the first vehicle control unit in case of a data failure and thus a blocking of communication lines affected by the failure can be avoided. This can prevent a failure from affecting other connected operation components, while operability of the vehicle control system and of the first operation component by a redundant control through another data connection still connecting the first operation component to the second vehicle control unit is maintained.

According to an embodiment, disabling the first data connection between the first operation component and the first vehicle control unit includes physically separating a communication line between the first operation component and the first vehicle control unit. The first data connection between the first operation component and the first vehicle control unit can comprise a switch connected to the communication line comprising one of an opto-coupler, a galvanic switch or an inductive coupling switch. The switch can be actuated by the first operation component which can receive a corresponding control signal from the first vehicle control unit via a signal line or wirelessly. By actuating the switch the communication line is physically separated. The control signal can be send from the first vehicle control unit to the first operation component by the first vehicle control unit controlling a wake-up line between the first vehicle control unit and the first operation component, e.g. by pulling to logical low level. However, the signal can also be transferred in a different way, for example, wirelessly.

The first operation component may comprise one or more transceivers connecting the first operation component to at least one of the first and second vehicle control units, respectively, as described above with regard to the system. Each of the one or more transceivers can be coupled or connected with the switch mentioned above and can be connected to a communication line between the first operation component and the first vehicle control unit or a communication line between the first operation component and the second vehicle control unit so that data can be transferred between the first operation component and the first and second vehicle control units. Each of the one or more transceivers can also be coupled or connected to one or more other operation components. In addition, each of the one or more transceivers can be coupled to at least one of the first and second vehicle control units by a wake-up line or another signal line or wirelessly to receive one or more control signals from the first and second vehicle control units, respectively.

The first operation component can be connected to the second vehicle control unit in the same way as the first vehicle control unit and the second data connection can be configured and controlled in the same way as described with regard to the first data connection.

This means that if one of the first and second vehicle control units identifies that the first operation component operates erroneously or provides faulty data, it can separate the first operation component from the corresponding first or second data connection connecting the first operation component to it to avoid a propagation of the error by sending a corresponding control signal to the first operation component.

According to an embodiment, the method includes enabling a second data connection between the first operation component and the second vehicle control unit by a second signal to the first operation component. The second data connection can be enabled at the moment when or after determining that erroneous data being transferred through the first data connection. Alternatively, the second data connection can be enabled continuously so that it is at least partially enabled simultaneously with the first data connection.

According to a further embodiment, the method further comprises exchanging data via the second data connection between the first operation component and the second vehicle control unit.

Transferring data over the second data connection permits to transfer correct data from the first operation component to one of the first or the second vehicle control units and to maintain operation of first operation component by bypassing the faulty data connection or transceiver connected to the data connection.

Furthermore, since the first data connection and the second data connection can be enabled simultaneously at least during some time period, the same data can be transferred from the first operation component over the first and second data connections. This permits to exchange the data between the first and the second vehicle control units and to perform plausibility checks or crosscheck tasks to determine if faulty data are received and hence increase safety of the vehicle control system.

According to an embodiment, the method further comprises exchanging data between the first vehicle control unit and the second vehicle control unit, determining an error of data transmitted through the first or second data connection based on the exchange of data between the first vehicle control unit and the second vehicle control unit and disabling the first or second data connection depending on whether the data comprising the error was transmitted through the first or second data connection, respectively.

According to an embodiment, the method further comprises exchanging data between the first vehicle control unit and the second vehicle control unit, determining an error of the first vehicle control unit or the second vehicle control unit and disabling the erroneous first or second vehicle control unit and exchanging data between the other one of the first or second vehicle control unit not being disabled and the first operation component.

According to an embodiment, the method further comprises determining an error of the first communication network and transferring data from a second communication network of the vehicle control system connected to the second vehicle control unit to the first vehicle control unit via a connection between the first and second vehicle control units. The data transferred from the second communication network to the to the first vehicle control unit may correspond to the data which have not been transferred from the first communication network to the first vehicle control unit due to the failure or down time of the first communication network and hence may replace these data so that the operation of the vehicle control system can be maintained.

The above embodiment may also be carried out in the opposite direction for transferring data from the first vehicle control unit to a component of the vehicle control system being connected to both, the first and the second communication network in a situation where a failure of the first communication network is detected or the first communication network is down. Then, data can be transferred via the second vehicle control unit and the second communication network to the component and correct operation of the vehicle control system can be maintained.

According to an embodiment, the method further comprises acts of enabling a third data connection between a second operation component, which is connected in parallel with the first operation component to the first and second vehicle control units, and the first vehicle control unit by a third signal sent to the first operation component, receiving data from the second operation component via the third data connection at the first vehicle control unit, determining that the data received from the second operation component is erroneous, sending a signal from the first vehicle control unit to the second operation component to disable the third data connection between the second operation component and the first vehicle control unit and disabling the third data connection between the second operation component and the first vehicle control unit.

According to an embodiment, the method further includes enabling a fourth data connection between the second operation component and the second vehicle control unit by a fourth signal from the second vehicle control unit to the first operation component. According to another embodiment, the method may also include exchanging data via the fourth data connection between the second operation component and the second vehicle control unit. The method may also include disabling the fourth data connection. Without limitation the method can be performed analogously by exchanging the first vehicle control unit and the second vehicle control unit, i.e. disabling the fourth data connection if erroneous data is exchanged or transferred via the forth data connection and transferring data over the third data connection instead.

Enabling or disabling the third or fourth data connection may have the same effects and advantages with regard to system redundancy and safety as described above with regard to the first and second data connection. Furthermore, the third and fourth data connection can be implemented and operated in the same way as the first or second data connection.

According to the invention, also a computer-readable medium comprising instructions which, when executed by a computer, perform a method including one or more of the acts described above is provided.

Further features, aspects and advantages of the application result from the following embodiments which are described with respect to the appended drawings.

DETAILED DESCRIPTION OF THE DRAWINGS

Figure 1:
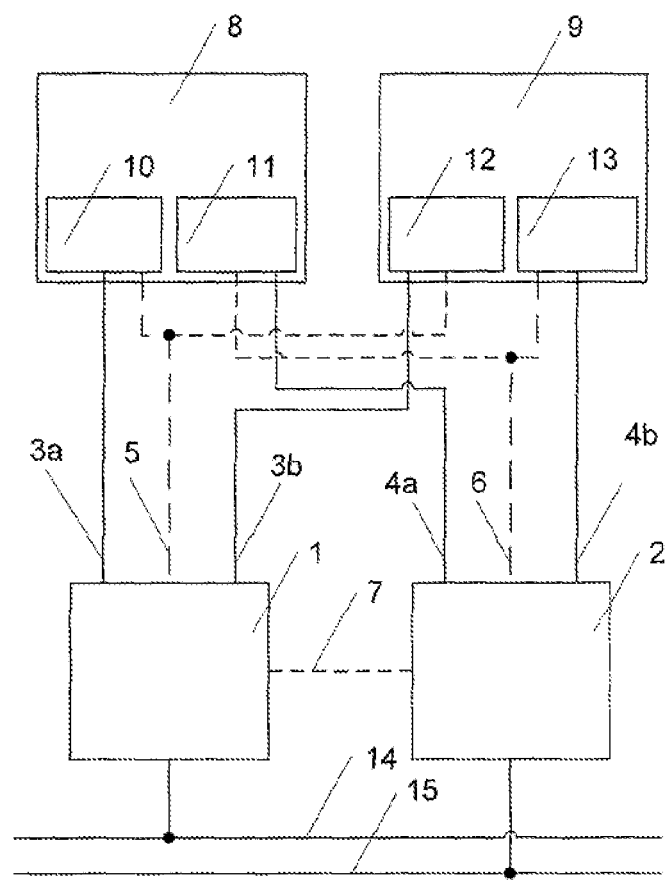
FIG. 1 shows an example of a vehicle control system according to an embodiment.

In the following an embodiment of a vehicle control system is described with regard to FIG. 1. The redundant control system comprises two vehicle control units 1 and 2. Each of the two vehicle control units 1 and 2 may comprise an IC or a microprocessor. Each of the vehicle control units is connected to one of the redundant vehicle communication networks 14 and 15. The vehicle communication networks 14 and 15 which may each comprise a data bus, can be connected to other components of the vehicle control system including one or more of a microprocessor, a memory or an interface. An interlink communication line 7 is provided between the vehicle control units. One of the vehicle control units is a master controller, while the other is a slave controller. The determination of the master-slave role is performed by at least one of the vehicle control units according to an appropriate algorithm and aligned through the interlink communication line 7.

The interlink communication line 7 between the vehicle control units 1, 2 makes it possible to mitigate a situation in which one of the vehicle communication networks 14 or 15 is in failure or down. In such a case data from the intact vehicle communication network can be transmitted to the first vehicle control unit connected to the faulty communication network via the $2^{nd}$ vehicle control unit and the interlink communication line 7. The interlink communication line 7 also provides an opportunity to perform a plausibility check or crosscheck tasks by the first and/or second vehicle control units to increase safety.

Each vehicle control unit 1, 2 is connected to at least two operation components 8 and 9 by redundant communication lines 5 and 6. The operation components 8 and 9 can be actuators such as wheel brake actuators, steering actuators or propulsion actuators or other actuators or components of a vehicle, in particular, a commercial vehicle.

Each operation component 8, 9 has a dedicated wake up line 3a, 3b, 4a, 4b from each of the vehicle control units 1, 2 by which it can wake them up. Vehicle control unit 1 is connected with a wake up line 3a for the operation component 8 and another wake up line 3b for the operation component 9. Similarly vehicle control unit 2 is connected with a wake up line 4a for the commanded operation component 8 and another wake up line 4b for the commanded operation component 9.

The operation components have transceiver pairs 10, 11 and 12, 13 for a connection to the communication lines 5, 6. Each transceiver is configured to access one operation component 8, 9. Since the operation component 8, 9 of the embodiment as shown may not by redundant and they may share several of their internal resources, e.g. power supply, microcontroller etc., a malfunction in a commanded operation component might lead to issues on the communication lines affecting other commanded units as well.

The transceivers 10, 11 and 12, 13 of the commanded units 8, 9 are designed in such a way that the operation components 8, 9 can be physically separated from the communication lines by the vehicle control units by controlling the wake-up lines connecting the operation components with the vehicle control units, e.g. by pulling the signal level to a logical low level. This means that if a vehicle dynamic control unit 1, 2 identifies that one of the operation components 8, 9 is erroneous, it can separate the operation component 8, 9 from the corresponding communication line 5, 6 to avoid a propagation of the error.

Figure 2:
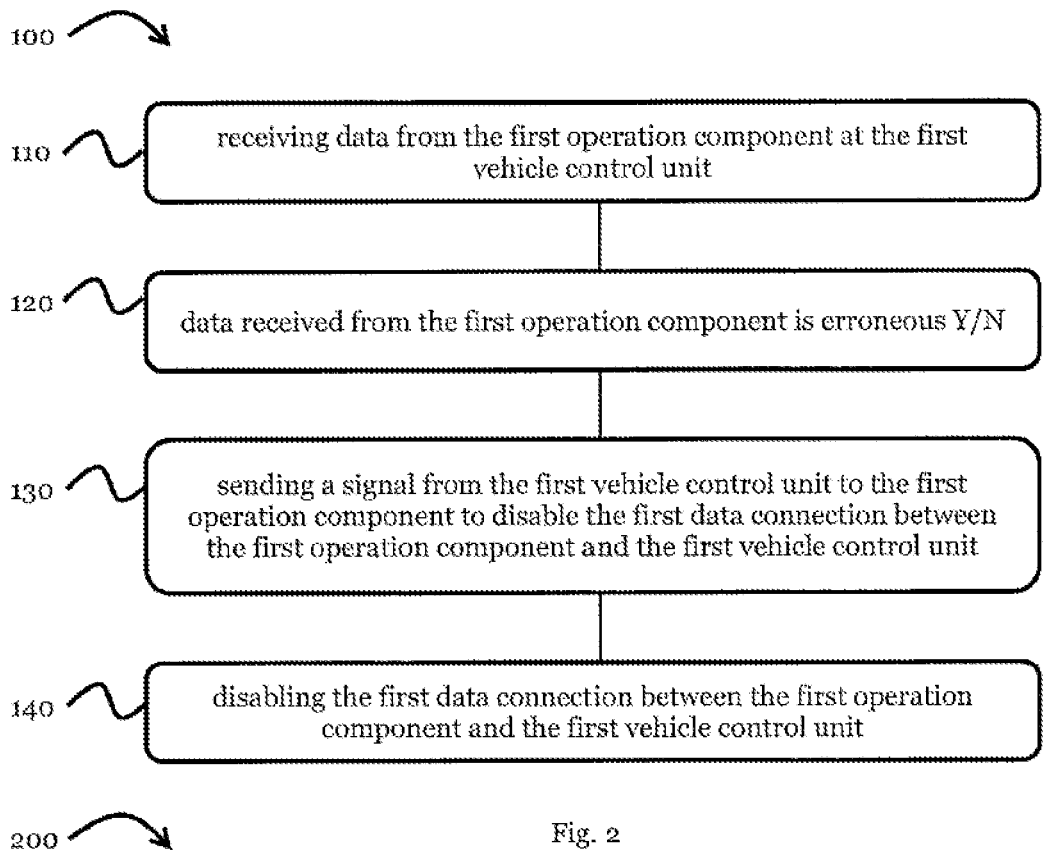
FIG. 2 shows a first example of a method of operating a vehicle control system according to a further embodiment.

FIG. 2 describes an example of a method 100 of operating a vehicle control system that can be carried out by the vehicle control system described in FIG. 1 without any limitation to this example. According to the example method 100 data are received from the first operation component at the first vehicle control unit at 110. A corresponding data connection between the 1$^{st}$ operation component and the 1$^{st}$ vehicle control unit has been enabled. At 120 the first vehicle control unit determines whether the data received from the first operation component is erroneous. If it is determined that the data is correct, the data will be processed as correct data by the vehicle control system. If it is determined that the data is not correct, i.e. erroneous, the method continues to 130, where a signal is sent from the first vehicle control unit to the first operation component to disable the first data connection between the first operation component and the first vehicle control unit. The signal can be received by the first operation component, in particular, by a transceiver arranged in the first operation component. Subsequently, in response to the signal the first data connection between the first operation component and the first vehicle control unit is disabled at 140. The first data connection can be physically separated by operating or actuating a switch such as an opto-coupler included in the data connection or a corresponding communication line. This has the effect that the error will be blocked from propagating to the vehicle control unit or to other operation components connected to the first operation component.

However, data from the first operation component can be transferred over a second redundant data connection from the first operation component to a second vehicle control unit which can process the data instead of the first vehicle control unit so that operation of the first operation component can be maintained. Accordingly, the security of the vehicle control system is increased.

The second redundant data connection can be enabled simultaneously with the first data connection and at least partially the same data can be transferred from the first operation component to the first vehicle control unit and from the first operation component to the second vehicle control unit simultaneously. By means of a data connection between the first vehicle control unit and the second vehicle control unit data sets simultaneously transferred over the first and second data connection can be exchanged between the vehicle control units or transferred from one of the vehicle control units to the other so that a data error in one of the simultaneously transferred data sets can be detected for example by comparison. In one or both of the first and second vehicle control units plausibility checks or cross-checks can be performed.

Alternatively, the second redundant data connection can be disabled at the beginning and subsequently enabled in response to the determination of a data error or a fault of the first and vehicle control unit.

Figure 3:
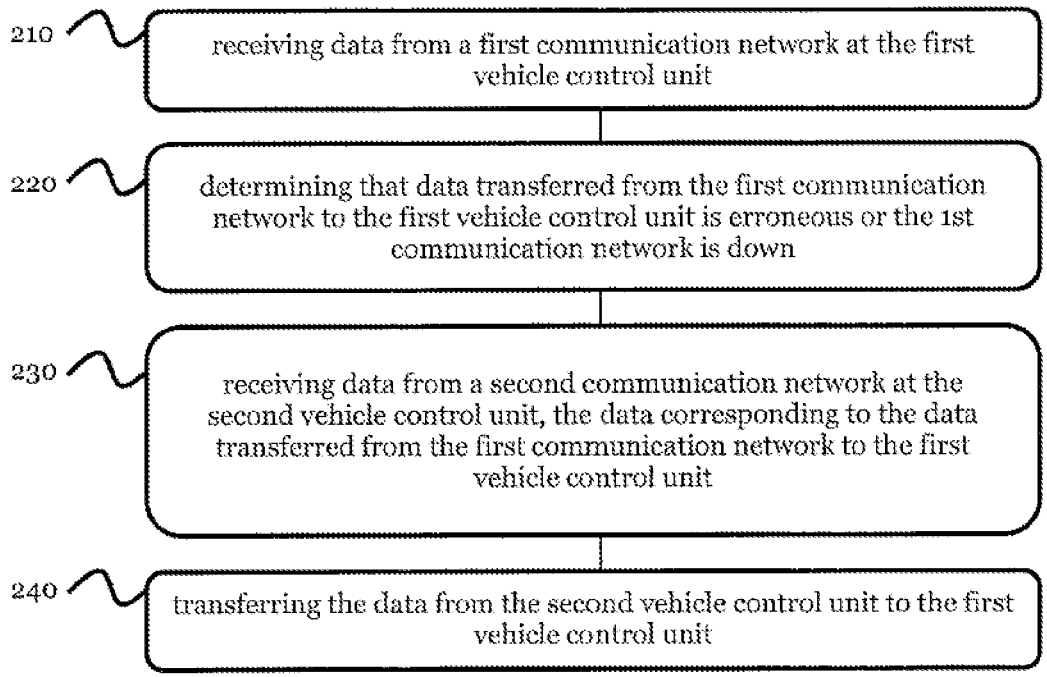
FIG. 3 shows a second example of a method of operating a vehicle control system according to another embodiment.

According to the example in FIG. 3 a method 200 is described which can be carried out by the vehicle control system described in FIG. 1 without any limitation to this example and by which the vehicle control system is further enhanced with regard to security. The method can be conducted in combination with the method according to FIG. 1 or separately. According to the method data from a component of the vehicle control system via a first communication network is received at the first vehicle control unit at 210. It may then be determined by the first vehicle control unit at 220 that data transferred from the first communication network to the first vehicle control unit is erroneous or that the first communication network is down. Hence, it is determined that the data transferred from the first communication network cannot be trusted or that no data can be transferred from the first communication network at all. In order to overcome this problem data will be received at 230 at the second vehicle control unit via a second communication network also connected to the component of the vehicle control system, wherein the data correspond to the correct data that should have been transferred via the first communication network to the first vehicle control unit or correspond to the data that would have been transferred via the first communication network, if the first communication network was not down. At 240 the data is transferred from the second vehicle control unit to the first vehicle control unit via a data connection between the first and the second vehicle control unit so that via the second communication network and the second vehicle control unit the same correct data provided by the first communication network can be provided to the first vehicle control unit and hence correct operation of the vehicle control system can be maintained even if the data cannot be transferred from the first communication network.

The method described with regard to FIG. 3 may also be carried out analogously for transferring data from the first vehicle control unit to a component of the vehicle control system being connected to both, the first and the second communication network in a situation where a failure of the first communication network is detected or the first communication network is down. Then, data can be transferred via the second vehicle control unit and the second communication network to the component and correct operation of the vehicle control system can be maintained.

Various changes can be made to the above described example embodiments without deviating from the ideas of the present application.

REFERENCE NUMERALS 1 first vehicle control unit
2 second vehicle control unit
3 a, b wake-up lines
4 a, b wake-up line
5 first data connection
6 second data connection
7 interlink communication line 8 first operation component
9 second operation component
10 transceiver
11 transceiver
12 transceiver
13 transceiver
14 first communication network
15 second communication network

The invention claimed is:

1. A vehicle control system, comprising:
a first communication network;
a first operation component,
a first vehicle control unit connected to the communication network and to the first operation component, wherein
the first vehicle control unit is configured to control a first data connection between the first operation component and the first vehicle control unit by a first signal to the first operation component; and
a second vehicle control unit connected to the first operation component, wherein
the second vehicle control unit is configured to control a second data connection between the first operation component and the second vehicle control unit by a second signal to the first operation component, wherein
the first data connection and the second data connection are controllable so that at least one of the first data connection and the second data connection is enabled or disabled.

2. The vehicle control system of claim 1, wherein
the first data connection between the first operation component and the first vehicle control unit comprises a switch, and
the switch is one of an opto-coupler, a galvanic switch or an inductive coupling switch.

3. The vehicle control system of claim 1, wherein
the first operation component comprises one or more transceivers connecting the first operation component to at least one of the first and second vehicle control units, respectively.

4. The vehicle control system of claim 1, wherein
the second vehicle control unit is connected to a second communication network that is separated from the first communication network.

5. The vehicle control system of claim 1, wherein
the second vehicle control unit is connected to the first vehicle control unit and data is transferrable from the first communication network to the first vehicle control unit and to the second vehicle control unit via a connection between the first and the second vehicle control units.

6. The vehicle control system of claim 1, wherein
the first vehicle control unit is a master vehicle control unit and the second vehicle control unit is a slave vehicle control unit, and
the master-slave role is determined by at least one of the first or second control units.

7. The vehicle control system of claim 1, further comprising:
a second operation component, wherein
the first vehicle control unit is connected to the second operation component and the first vehicle control unit is configured to control a third data connection between the second operation component and the first vehicle control unit by a third signal to the second operation component; and
the second vehicle control unit is connected to the second operation component and the second vehicle control unit is configured to control a fourth data connection between the second operation component and the second vehicle control unit by a fourth signal to the second operation component, wherein
the third data connection and the fourth data connection are controllable so that at least one of the third data connection or the fourth data connection is enabled or disabled.

8. The vehicle control system of claim 1, further comprising:
a second operation component, wherein
the first data connection between the first operation component and the first vehicle control unit is disabled,
the first vehicle control unit is connected to the second operation component via a third data connection, and
the third data connection is maintained while the first data connection is disabled.

9. A method of controlling a vehicle via a vehicle control system having a first communication network, a first operation component, a first vehicle control unit connected to the communication network and to the first operation component, and a second vehicle control unit connected to the first operation component, the method comprising:
enabling a first data connection between the first operation component and the first vehicle control unit by a first signal to the first operation component;
enabling a second data connection between the first operation component and the second vehicle control unit by a second signal to the first operation component;
receiving data from the first operation component at the first vehicle control unit;
determining that the data received from the first operation component is erroneous;
sending a signal from the first vehicle control unit to the first operation component to disable the first data connection between the first operation component and the first vehicle control unit; and
disabling the first data connection between the first operation component and the first vehicle control unit.

10. The method of claim 9, wherein disabling the first data connection between the first operation component and the first vehicle control unit comprises physically separating a communication line between the first operation component and the first vehicle control unit.

11. The method of claim 9, further comprising:
exchanging data via the second data connection between the first operation component and the second vehicle control unit.

12. The method of claim 9, further comprising:
exchanging data between the first vehicle control unit and the second vehicle control unit,
determining an error of data transmitted through the first or second data connection based on the exchange of data between the first vehicle control unit and the second vehicle control unit, and
disabling the first or second data connection depending on whether the data comprising the error was transmitted through the first or second data connection, respectively.

13. The method of claim 9, further comprising:
exchanging data between the first vehicle control unit and the second vehicle control unit, determining an error of the first vehicle control unit or the second vehicle control unit and disabling the erroneous first or second vehicle control unit, and exchanging data between the other one of the first or second vehicle control unit not being disabled and the first operation component.

14. The method of claim 9, further comprising:

determining an error of the first communication network and transferring data from a second communication network connected to the second vehicle control unit to the first vehicle control unit via a connection between the first and second vehicle control units.

15. The method of claim 9, further comprising:

enabling a third data connection between a second operation component, which is connected in parallel with the first operation component to the first and second vehicle control units, and the first vehicle control unit by a third signal sent to the second operation component;

receiving data from the second operation component via the third data connection at the first vehicle control unit;

determining that the data received from the second operation component is erroneous;

sending a signal from the first vehicle control unit to the second operation component to disable the third data connection between the second operation component and the first vehicle control unit;

disabling the third data connection between the second operation component and the first vehicle control unit; and exchanging data via a fourth data connection between the second operation component and the second vehicle control unit.

16. The method of claim 9, further comprising:

enabling a third data connection between a second operation component and the first vehicle control unit; and exchanging data via the third data connection between the second operation component and the first vehicle control unit while the first data connection remains disabled.

17. A computer product comprising a non-transitory computer-readable medium having stored thereon program code which, when executed by a computer, carries out the acts of:

enabling a first data connection between a first operation component and a first vehicle control unit by a first signal to the first operation component;

enabling a second data connection between the first operation component and a second vehicle control unit by a second signal to the first operation component;

receiving data from the first operation component at the first vehicle control unit;

determining that the data received from the first operation component is erroneous;

sending a signal from the first vehicle control unit to the first operation component to disable the first data connection between the first operation component and the first vehicle control unit; and disabling the first data connection between the first operation component and the first vehicle control unit.

* * * * *